No. 861,325. PATENTED JULY 30, 1907.
J. L. SNITKER & W. S. CARL.
DEVICE FOR CLEANING OVERHEAD TROLLEY WIRES.
APPLICATION FILED AUG. 29, 1906.
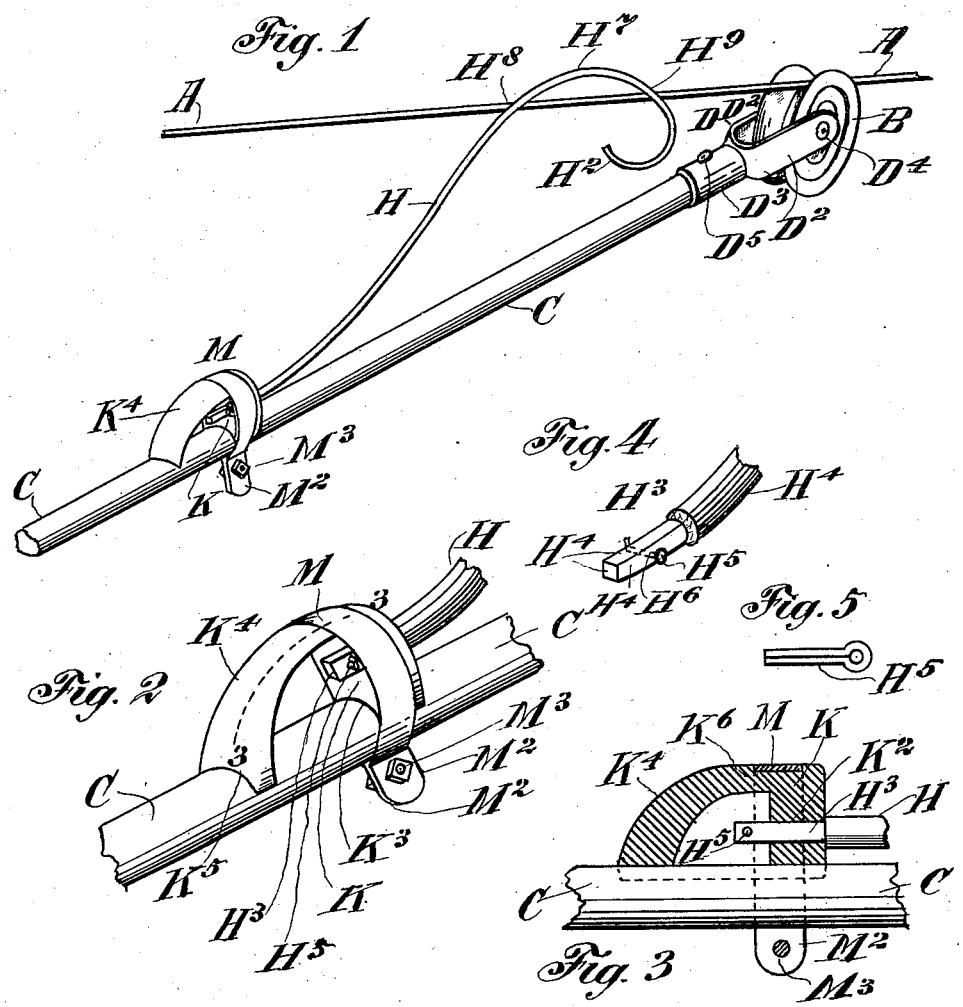
WITNESSES:
INVENTORS
John L. Snitker
and Wilmer S. Carl
per Wm. Hubbell Fisher
ATTORNEY.

UNITED STATES PATENT OFFICE.

JOHN L. SNITKER AND WILMER S. CARL, OF CINCINNATI, OHIO.

DEVICE FOR CLEANING OVERHEAD-TROLLEY WIRES.

No. 861,325.　　　　　Specification of Letters Patent.　　　Patented July 30, 1907.

Application filed August 29, 1906. Serial No. 332,489.

*To all whom it may concern:*

Be it known that we, JOHN L. SNITKER and WILMER S. CARL, citizens of the United States, and residents of the city of Cincinnati, in the county of Hamilton and State of Ohio, have invented certain new and useful Improvements in Devices for Cleaning Overhead-Trolley Wires, of which the following is a specification.

In cold weather, the overhead trolley wire whereby an electric current is transmitted for the propulsion of cars is frequently coated with snow. The latter often melts slightly especially at noonday under the rays of the sun or of a somewhat higher temperature, and then toward evening or by reason of a lower temperature, becomes ice. Again in a rainstorm, at low or falling temperatures, the descending rain is frozen on the wire. Still again during a fall of sleet, the wire receives much of it. In all of these instances, this overhead trolley wire becomes coated with snow or ice. This coating of snow or ice interrupts the transmission of the electric current from this overhead wire to the trolley, and the motor of the car not receiving its proper amount of electricity from the trolley will either proceed very slowly or stop altogether.

Our invention attains its object in keeping this overhead wire clear and clean of ice in a prompt and efficacious manner.

We will now proceed to describe our invention in detail.

In the accompanying drawings making a part of this application, and in which similar letters of reference indicate corresponding parts,—Figure 1 is a view in perspective of an overhead trolley wire, and of a trolley wheel in contact with this wire. This view also shows the upper portion of the trolley wheel pole and our invention in connection with the pole and with the overhead trolley wire. Fig. 2 is a perspective view of the lower end portion of our device, and of that part of the trolley pole to which it is attached. Fig. 3 is a view partly in section and partly in elevation of the device shown in Fig. 2. The section is taken in the plane of the dotted line 3, 3, of Fig. 2. Fig. 4 is a perspective view of a detail, namely: the lower end of the rod for cleaning the trolley wire of ice and snow, showing its preferred shape for entering into and for being connected with the means for holding it to the trolley pole. Fig. 5 is an elevation of a key employed to connect the end of the rod shown in Fig. 4 with the rest of the device which holds this end of the rod to the trolley pole. The Figs. 2, 3, 4 and 5 are on a scale larger than that on which Fig. 1 is drawn, for the purpose of better illustrating the construction of the parts therein figured.

A indicates a trolley overhead wire, a part only of which is shown. Through this wire A the electric current passes. The trolley wheel B travels on this wire in the usual manner.

The trolley pole C is connected to the wheel B in any suitable manner. In the present illustrative instance, it is connected as follows: There is a forked piece D of iron, having the arms $D^2$, $D^2$, joined to the sleeve $D^3$. The wheel B is so located that it, at the hub portion, is between the arms $D^2$, $D^2$. Pivotal extensions $D^4$ of the hub, or ends of the axle of this wheel are respectively received in the respective arms $D^2$ of this fork. The upper end of the pole C is set in the sleeve $D^3$ and secured therein by a set screw $D^5$. The arrangement is such that the trolley wheel B is free to rotate and at the same time convey the electric current of the trolley wire A from that wire through the pole to the electric motor of the car.

Our invention consists as follows: We provide a curved rod H. The upper end $H^2$ of this rod H is preferably free and independent of the trolley pole C. The lower end of this rod H is connected to a block or piece K, and preferably as follows: The adjacent end portion $H^3$ of the rod H is provided with several faces $H^4$, $H^4$, $H^4$, $H^4$, preferably four in number. This end portion thus angulated in cross section is inserted in the block K. The opening $K^2$ in this block to receive the angulated end $H^3$ is also similarly angulated in cross section. The object of thus angulating the end $H^3$ and the opening $K^2$ is to prevent the rod H turning or twisting. This object could be accomplished in various other well known ways, among which may be mentioned a feather or spline or key present in the connection between the rod H and the block K, or by a cross bolt. The illustrated mode is an obviously preferable one. To secure the end portion $H^3$ of the rod H in position in the block K, that is, to prevent its being accidentally drawn out therefrom, we provide a split key or pin $H^5$. The latter is passed through an opening $H^6$ in the end portion $H^3$ of the rod H. Those free ends of this split pin $H^5$ which project beyond the portion $H^3$ are bent apart. The pin $H^5$ is then securely held in place. Various modes of connecting this block K to the trolley pole C may be employed. A mode of our invention, and one very advantageous, is as follows: The block K is concaved at $K^3$ to fit the convex shape of the trolley pole C. From the upper part of the block K extends an extension $K^4$ which exteriorly curves over and down. The bottom $K^5$ of this extension is concaved to fit the trolley pole C, and fits down upon the pole. A band M passes around the under side of the trolley pole C and over the top of the block K. There is a recess $K^6$ in the block, and the band M fits into this recess $K^6$. The band M is preferably in the shape of a collar, and its joining ends $M^2$, $M^2$, are forcibly drawn together and held there by a bolt and nut $M^3$. By these means the band cannot slip off from the trolley pole, and the block K, $K^4$, is held firmly to the trolley pole C at the desired place.

The mode in which our invention operates is as follows: When the trolley wheel B bears against the trolley wire A, the upper bend H⁷ of the rod H bears at two points, namely: H⁸ and H⁹ against the trolley wire. The rod H will bear with considerable pressure against the trolley wire A, because, when located as shown, it will be deflected from the plane which it naturally assumes. As the car advances, the rod H at the places H⁸ and H⁹ of it rubs the trolley wire A. As the car backs, the rod H at the places H⁸ and H⁹ of it rubs the trolley wire A. Whenever snow or ice is on the trolley wire A, or adheres to it, then as the car moves forward or backward, this rod H will rub and break the snow or ice off from the wire. In case the trolley wheel B fails for any reason to make proper electrical contact with the trolley wire A, the rod H will duly transmit the electrical current from this wire A to the motor on the car.

What we claim as new, and of our invention and desire to secure by Letters Patent, is:—

1. In an overhead trolley wire system, a vehicle, a trolley pole and the trolley wheel, and a rod located on the trolley pole and extending up at one side of the trolley wire and beyond the trolley wire and elastically bearing against one side of this trolley wire, means for causing this wire to press elastically against the side of the trolley wire, and to elastically yield when necessary, this wire being in advance of the trolley wheel, substantially as and for the purposes specified.

2. A scraper for a trolley wire consisting as follows: a bent rod whose bend is adapted to touch the trolley wire at two points, a trolley pole, a lower block fitted on the trolley pole and provided with a rear extension fitting the trolley pole, a clamp or band, embracing the block, and secured from opening, the lower end of the bent rod being inserted into the block and there secured, and means for preventing this rod from turning, substantially as and for the purposes specified.

3. A scraper for a trolley wire consisting as follows: a bent rod whose bend is adapted to touch the trolley wire at two points, a trolley pole, a lower block rigidly held to the trolley pole, and having an opening angulated in cross section, the lower end of the bent rod being angulated in cross section, and being received in said opening, and secured thereto, substantially as and for the purposes specified.

4. A scraper for a trolley wire consisting as follows: a bent rod whose bend is adapted to touch the trolley wire at two points, a trolley pole, the upper end of the rod being free and independent of the pole, a lower block rigidly held to the trolley pole, and having an opening angulated in cross section, the lower end of the bent rod being angulated in cross section and being received in said opening, and a split key located in and through the end of the bent rod behind the block, substantially as and for the purposes specified.

5. A scraper for a trolley wire consisting as follows: a bent rod whose bend is adapted to touch the trolley wire at two points, a trolley pole, the rod connected rigidly at its lower end to the pole, and secured against being twisted, the rod being adapted to elastically bear against the wire, the bent rod where it touches the wire being in advance of where the trolley wheel contacts with the trolley wire, substantially as and for the purposes specified.

6. A scraper for a trolley wire consisting as follows: a bent rod whose bend is adapted to touch the trolley wire at two points, a trolley pole, the upper end of the rod being free from the pole, a lower block fitted on the trolley pole and provided with a rear extension fitting the trolley pole, the block having a recess in it, a clamp or band embracing the block, entering said recess and held together, the lower end of the bent rod being inserted into the block and secured there and means for preventing the rod from turning, substantially as and for the purposes specified.

7. A scraper for a trolley wire consisting as follows: a bent rod whose bend is adapted to touch the trolley wire at two points, a trolley pole, the upper end of the rod free of the pole, a lower block fitted on the trolley pole and provided with a rear extension fitting the trolley pole, the block having a recess in it, a clamp or band embracing the block, entering said recess and held together, the lower end of the bent rod being inserted into the block, this end of the bent rod being angulated, and the opening of the block being likewise angulated, this opening receiving such end of the bent rod, and a key located in this end of the bent rod to prevent its withdrawal from the block, substantially as and for the purposes specified.

JOHN L. SNITKER.
WILMER S. CARL.

Attest:
ALFRED B. BENEDICT,
K. SMITH.